United States Patent
Liebig et al.

[15] 3,696,589
[45] Oct. 10, 1972

[54] ADJUSTABLE AIR POLLUTION CONTROL SCRUBBER BED

[72] Inventors: Preston D. Liebig, West Hartford; William B. Hurlbut, Sr., Windsor, Conn.

[73] Assignee: Combustion Engineering, Inc., Windosr, Conn.

[22] Filed: Oct. 22, 1970

[21] Appl. No.: 83,103

[52] U.S. Cl. ...................... 55/233, 55/422, 55/494, 55/512, 261/96, 261/98
[51] Int. Cl. ............................................. B01d 47/00
[58] Field of Search ........ 55/220, 230, 231, 233, 242, 55/328, 422, 494, 512; 261/96–98, 113–114

[56] References Cited

UNITED STATES PATENTS

| | | |
|---|---|---|
| 1,497,367 | 6/1924 | Frese ...................... 55/422 X |
| 1,732,086 | 10/1929 | Flippen .................... 55/231 X |
| 2,234,385 | 3/1941 | Ryner ....................... 261/113 |
| 3,353,799 | 11/1967 | Lions et al. .............. 55/233 X |

*Primary Examiner*—Frank W. Lutter
*Assistant Examiner*—Vincent Gifford
*Attorney*—Eldon H. Luther, Robert L. Olson, John F. Carney and Richard H. Berneike

[57] ABSTRACT

An improved arrangement for an air pollution control system incorporating a wet scrubber wherein the scrubber bed is made in sections which are adjustably located within the scrubbing housing. The scrubber bed is formed of standard size modules and each module is supported within the scrubber housing for adjustment therein. The number of modules is dependent upon the preliminary design characteristics for the pollution control desired to be achieved for the particular combustion system, while the adjustability within the scrubber of the beds enables the beds to be repositioned for particular flow characteristics of the gas being scrubbed.

4 Claims, 3 Drawing Figures

PATENTED OCT 10 1972  3,696,589

ADJUSTABLE AIR POLLUTION CONTROL SCRUBBER BED

BACKGROUND OF THE INVENTION

One of the foremost problems which confronts mankind today is that of air pollution. This problem is accentuated by the fact that to some degree nearly all industrial and commercial activities emit pollutants of the air. These air pollutants fall into three major categories: particulate matter, gaseous pollutants and odor. One of the primary contributions to air pollution occurs with the combustion of fossil fuels for the purpose of power generation. Combustion gases contain both particulate matter and certain gaseous compounds which are generally injurious to health and damaging to physical property.

A system has been developed to substantially reduce both the particulate matter and the toxic gases contained in the flue gases resulting from the fossil fuel combustion process. This system involves the feeding of an alkaline earth additive to the furnace and wet scrubbing the flue gases. The pulverized additive fed to the furnace is calcined producing a more reactive compound. The calcined particles react with the combustion gases to form compounds of calcium and magnesium (removing a large percent of sulfur oxides from the gas) which are scrubbed from the flue gas in the wet scrubber. The flue gas containing the unreacted sulfates and calcined additive also passes into the wet scrubber wherein the calcined additive that is not combined with the sulfate in the furnace reacts with the water and the remaining sulfate to form sulfates and sulfites of calcium and magnesium which are also scrubbed from the gas. Additionally, the water serves to entrain the fly ash, resulting in particulate matter removal due to the washing action within the scrubber. The cleansed flue gases then pass through a demister for removal of the remaining water in the gas.

Wet scrubbers are capable of a wide range of applications as dust collectors but involve an extremely complex process having no proven theoretical analysis. It is, however, known that the dust particles must impact on a water droplet in order to be removed and the impaction efficiency is essentially a direct function of the relative velocity of the gas and an inverse function of the droplet diameter. The scrubbing action may therefore be considered a turbulent friction simulating type of action. With proper allowance for the requirements of a high relative velocity and the impaction of the particles and droplets, a maximum collection efficiency can be gained for a given amount of expended energy. In the packed type scrubber, maximum impaction conditions between the gas and the water are achieved by passing the dirty gas through a bed of material with water sprays entering the packed bed from the top. The gas forces its way through the bed of wet material towards the gas exit at the top.

SUMMARY OF THE INVENTION

In order to make the action of the scrubber bed of the above-described system more predictable, as well as more versatile, there is herein provided an adjusting means for positioning the bed within the scrubber housing. Additionally, the scrubber bed is formed in particularly sized modules for the purpose of standardization in design. In this manner, standardized equipment may be selected and optimumly utilized in the above-described air pollution control system on steam generating facilities of varying sizes. The scrubber bed for each facility may be generally calculated to include a number of standard size bed modules to accomplish the necessary pollution control to meet desired design criteria. By having a degree of adjustability of the scrubber bed modules, the bed can be repositioned within the scrubber for particular flow characteristics of the gases to be scrubbed.

DESCRIPTION OF THE PREFERRED EMBODIMENT

Figure 1:
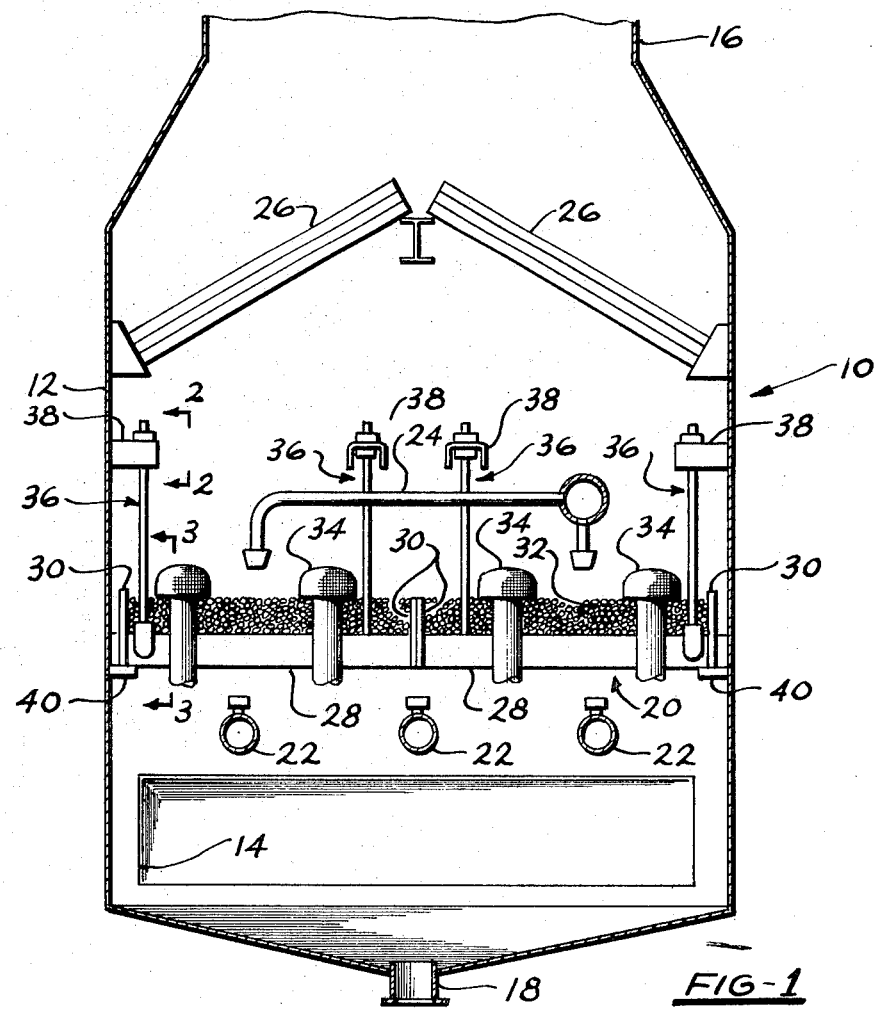
FIG. 1 is a cross sectional view of the air pollution control system scrubber unit having an adjustable scrubber bed according to this invention.

Referring now to the drawings, FIG. 1 shows a scrubber arrangement 10 for an air pollution control system employing wet scrubbing. The scrubber arrangement 10 has a housing 12 having a flue gas inlet 14 for conveying combustion product gases to the scrubber arrangement 10 and a clean gas outlet 16 for passing the scrubbed gases to any suitable outlet. The housing 12 at its lower portion has a solid particle discharge 18 for the purpose of removal of the particulate matter scrubbed from the combustion gases.

Within the housing 12 is the active bed portion 20 of the scrubber arrangement 10. Below the bed 20 is located underbed spraying means 22 while above the bed there are overbed spraying means 24. The spraying means 22 and 24 perform the washing action of the gases as they pass through the active bed 20 in a manner which is conventional in wet scrubbing devices. Between the active bed 20 and the clean gas outlet 16 there is a demister section 26 which serves to remove water vapor from the clean gas before it travels out to the atmosphere.

The active bed 20 is comprised of a modular base 28 having side walls 30 extending above the level of the base 28 and forming standard sized compartments for the purpose of containing the bed material 32, which may be loose marbles or any other suitable material. Extending throughout the bed material 32 are overflow pots 34 for the purpose of controlling the liquid depth in the bed. The pots 34 permit overflow $H_2O$ to be passed, along with solid water, to the bottom of the scrubber housing 12 and through outlet 18 thereof. The bed 20 may be made to include standard size compartment beds for the purpose of optimizing the design to achieve desired pollution control.

Figure 2:
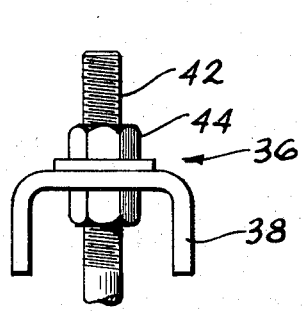
FIG. 2 is a view of a first portion of the scrubber bed adjusting means taken on the lines 2—2.
Figure 3:
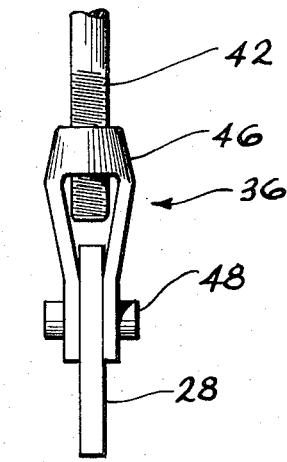
FIG. 3 is a view of a second portion of the scrubber bed adjusting means taken on line 3—3.

The position of the active scrubber bed 20 within the housing 12 is regulated and leveled by the adjustable support hangers 36, which extend from upper support brackets 38 to the scrubber bed base elements 28. Temporary support is provided to the scrubber bed by base support 40. As best seen in FIGS. 2 and 3, the support hangers 36 comprise elongated rods 42 threaded at the opposite ends thereof. The upper threaded portion of the rod 42 extends through the upper support bracket 38 and is adjustably secured thereto by the nut and washer assembly 44. The lower threaded end of rod 42 has attached thereto a threaded connector 46 which has a pin connection 48 with the scrubber bed base 28. Each of the modules of the active bed 20 is supported by a plurality of the hanger elements 36. By adjusting the nut and washer assembly 44, the effective length of the rod 42 may be changed to level or adjust the height, independently, of each of the modules of the bed 20 with respect to the overbed and underbed sprays (24, 22) to maximize scrubbing efficiency for the gas flow characteristics of the particular combustion unit in which the pollution control arrangement is functioning.

As a result of the above-described arrangement, wet scrubbers for air pollution control systems may be designed using standard sized adjustable scrubber bed modules. Over-all system design will dictate the number of standard modules to be located within the wet scrubber housing. By having the active bed adjustably supported within the housing, repositioning of the bed in relationship to the overbed and underbed spray nozzles may be accomplished so as to compensate for flow characteristics of the gases in the particular system to be scrubbed.

It will be understood that various changes in the details, materials, and arrangements of parts which have been herein described and illustrated in order to explain the nature of the invention may be made by those skilled in the art within the principle and scope of the invention as expressed in the appended claims.

We claim:

1. In an air pollution control system for controlling pollutants in gases resulting from combustion of fossil fuels, the control system having a scrubber housing and an overbed and underbed spraying apparatus within said housing, the improvement comprising: a multisection scrubber bed extending in a plane across said housing between said overbed and underbed spraying apparatus, both of said overbed and underbed spraying apparatus being directed toward said scrubber bed, and multiple independent adjustment means for selectively controlling the position of each of the scrubber bed sections with respect to said overbed and underbed spraying apparatus.

2. The apparatus of claim 1 wherein each of said independent adjustment means includes an elongated rod threaded at each end, a support fixed to said scrubber housing above the desired scrubber bed level and a threaded connector fixed to said scrubber bed, said elongated rod being adjustably connected to said support at one end and to said threaded connector at its other end.

3. The apparatus of claim 1 wherein each of said sections of said scrubber bed is a container having a base permitting the passage of gas therethrough and upstanding side walls for confining scrubber bed material, each of said sections being uniform in size and configuration.

4. The apparatus of claim 3 wherein said independent adjustable means includes elongated rods threaded at each end, supports fixed to said scrubber housing above the desired scrubber bed level, and threaded connectors connected to said scrubber bed sections, said elongated rods being adjustably connected to said supports at one end and said threaded connectors at the other ends thereof so as to enable the sections to be selectively independently adjusted.

* * * * *